United States Patent [19]
Sakakibara

[11] 3,874,243
[45] Apr. 1, 1975

[54] VEHICLE SPEED GOVERNOR
[75] Inventor: Naoji Sakakibara, Chiryu, Japan
[73] Assignee: Aisin Seiki Kabushiki Kaisha, Kariya, Japan
[22] Filed: Nov. 9, 1973
[21] Appl. No.: 414,429

[30] Foreign Application Priority Data
Nov. 16, 1972 Japan............................. 47-132356

[52] U.S. Cl.......................... 73/526, 73/530, 73/550
[51] Int. Cl......................... G01p 3/16, G05d 13/16
[58] Field of Search ............. 73/526, 530, 535, 550

[56] References Cited
UNITED STATES PATENTS
2,268,230 12/1941 Warner.............................. 73/550 X
2,639,134 5/1953 Winslow et al....................... 73/530

*Primary Examiner*—James J. Gill

[57] ABSTRACT

A vehicle speed governor including a housing, a shaft which is revolved by the vehicle engine, a carriage mounted on the shaft to rotate therewith, a pair of weights pivoted to the carriage to swing, an arm extending from the weights, a plunger axially slidably movable on the axis of rotation of the shaft, lever or drive means normally spring-biased toward abutment against one end of the plunger to cause the plunger to abut against the carriage, resilient and flexible connecting means to resiliently keep the extremity of the arms in contact with the end of the plunger whereby the plunger is axially moved owing to pivoting movement of the weights and switching means for controlling the vehicle circuit to control the speed of travel of the vehicle.

5 Claims, 4 Drawing Figures

VEHICLE SPEED GOVERNOR

BACKGROUND OF THE INVENTION

This invention relates to a so-called "fly-ball type" speed governor adapted particularly to be used in controlling the speed of an automotive vehicle.

Various speed governors have been proposed heretofore for use in automotive vehicles to enable the vehicle to maintain a predetermined speed without requiring the driver to keep his foot on the accelarator pedal in recognition of convenience and other advantages of such speed governors.

In the case of a fly-ball type governor, weights or balls attached to pivoted levers are revolved by the engine and if the speed increases above or decreases below a desired one, the balls or weighted levers move outward from or inward to the axis of rotation, owing respectively to the increase or decrease in centrifugal force. This change in the position of the revolving balls may be transmitted through a suitable connecting mechanism to a circuit controlling means such as a switching mechanism, for example.

It has been the practice in the conventional manner that such connecting mechanism is formed of a lever extending from the weights and a pair of collars spaced on an axially movable plunger between which the extremity of the lever is slidably or rotatably fitting, the plunger being connected with the switching mechanism.

Little tolerance is permitted in such slidable or rotatable connection for longer service life of the governor, because of tendency of defacing the extremity of the lever or collar faces owing to a multiplicity of repeated shocks resulting from the alternated effects of gravity of the weight relative to either collar, causing the extremity of the arm to repeatedly strike the face of either collar under considerable inertial force. This is considered as a great deficiency, in that in substantial saving the manufacturing labor and costs that little tolerance presents a considerable disadvantage.

SUMMARY OF THE INVENTION

Accordingly, among the objects of the present invention is the provision of a device for connecting the arm with the plunger by means of a clamping or connecting member being of resilient property and adapted to normally keep the extremity of the arm in resilient contact relation with the end face of the plunger, which is substantially devoid of the foregoing and related disadvantages and drawbacks inherent in the prior art arrangement.

The foregoing and other objects are attained by a speed governor of a automotive vehicle, which according to the present invention comprises a housing, a shaft which is revolved by the vehicle engine, a carriage being fast with the shaft to rotate therewith, at least a pair of weights pivoted to the carrage to swing, an arm extending from the weights, a plunger axially slidably movable on the axis of rotation of the shaft, a lever or drive means normally spring biased toward abutment against one end of the plunger to thereby in turn cause the plunger to abut against the carriage, electric circuit controlling means operatively connected with said lever or drive means and resiliently connecting means to keep the extremity of the arm in resilient contact with the end of the plunger whereby the plunger is axially moved and in turn said electric circuit controlling means is operated through the plunger and the drive means.

DESCRIPTION OF THE PREFERRED EMBODIMENTS

Figure 1:
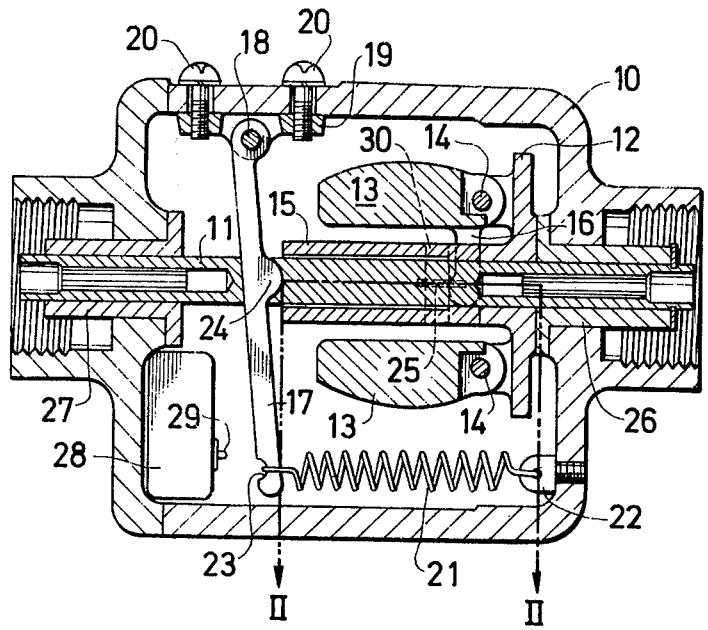
FIG. 1 is an enlarged fragmentary axial sectional view of the governor according to the present invention.

Referring to the drawings, within a housing 10 mounted is a governor shaft 11 for rotation through bearings 26 and 27, the revolution of which may vary by being connected with some machanism whose speed varies. The shaft 11 carries a carriage 12 integral with the shaft 11 to together rotate therewith for governor weights 13. These governor weights 13 are pivoted as at point 14 so that under the centrifugal action of the revolution of the shaft 11 these weights move outwardly and rightwardly about the point 14 as a center.

Figure 2:
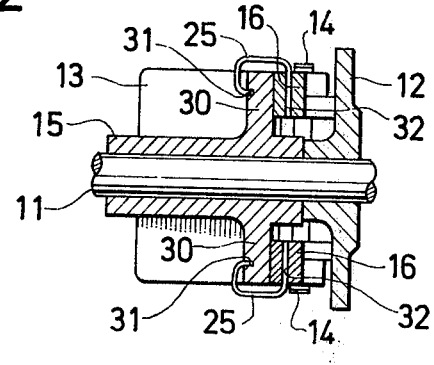
FIG. 2 is a cross sectional view taken along the line II—II of FIG. 1.

A freely movable sliding plunger or controlling element 15 of simple tubular form is axially sliding and rotating fit on the shaft 11. The weights have a contact tongue or arm 16 as best shown in FIG. 2 with its extremity normally resiliently kept in contact with the end face of the flange 30 of the plunger 15 so that the arms 16 are adapted to move the plunger 15 longitudinally in line with the axis of the shaft 11 as arm 16 of the weights moves outwardly and backwardly. A lever 17 or drive means is pivotally supported on the housing 10 by means of a suitable pin 18 which extends through a member 19 fastened to the housing 10 by means of bolts 20. The free end of the lever 17 engages one of extremities of a tensioned spring 21 the other end of which is anchored to the housing 10 by a member 22 screwed into the wall of the housing 10 with its small hole engaged by the hooked extremity of the spring 21. At the middle portion of the lever 17 is formed with a projection 24 the apex of which is chamfered or rounded to provide a smooth sliding contact with the end face of the rotating plunger 15.

It will be noted that the carriage 12 is normally springbiased toward abutment against the flanged portion of the bearing sleeve 26 by the spring 21 through the lever 17, plunger 15 and the arms 16. Under the centrifugal action of the revolving of the shaft 11, the arms 16 of the weights 13 move the plunger 15 axially due to centrifugal force upon change in the speed of rotation of the carriage 12 which occurs when vehicle speed varies.

In accordance with one aspect of the present invention a micro switch 28 is positioned to be operated by the lever or drive member 17 for controlling means, such as, for example the usual speed regulating mechanism for controlling the speed of an automotive vehicle. The numeral 29 indicates a mobile switch arm of usual form in the conventional manner. The lever 17 engages the arm 29 by being moved to the left by the movement of the plunger 15 owing to the increase in centrifugal force acting on the weights, so that the switch 28 controls the circuit.

Figure 3:
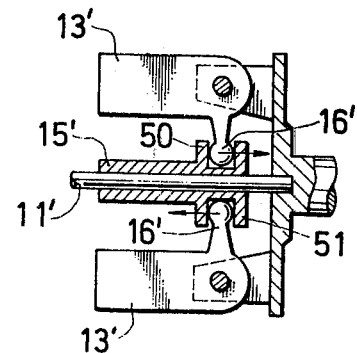
FIG. 3 is cross sectional view similar to FIG. 2 of a conventional governor.

The principal feature of the governor is described herebelow by comparing the embodiment in FIG. 1 with one of conventional governors shown in FIG. 3.

As viewed in FIG. 3, it has been the practice in the conventional manner that in connecting the plunger 15' with the arms 16' the plunger 15' is provided with a pair of spaced collars 50 and 51, while the weights 13' have a contacting tongue or cam 16' slidably fitting a groove formed by the pair of collars and adapted to move the plunger 15' longitudinally in line with the axis of the shaft 11' as the arm 16' of the weights moves outwardly or inwardly.

So far, then it will be seen that if the shaft 11' were held stationary with both the weights in a imaginary vertical plane as shown in FIG. 3, then the effect of gravity on the upper weight 13' would tend to move the plunger 15' to the right in the view through the arm 16' thereof while the effect of gravity on the other lower weight 13' would tend to move the plunger 13' in the reverse direction. Such opposite effects directly balance each other and once vary every quarter revolution of the shaft 11' from the minimu up to the maximum or from the maximum to the minimum.

In case where the governor is operated at a lower speed of rotation of the shaft 11', the actual governor parts is effected by the aforementioned opposed two actions of gravity at a higher rate, than is effected by the pure centrifugal force acting on the both weights, so that the slower the rotational speed of the shaft 11', the greater will be the effect of the action of gravity.

If a clearance is tolerated between the extremity of the arm 16' and either collar of the plunger 15', the tendency always exists of defacing the extremity or the collar because of multiplicity of repeated shocks resulting from the alternated effect of gravity of the weight relative to either collar, causing the extremity of the arm 16' to strike repeatedly the face of the collar under considerable inertial force. As a consequence, little tolerance is permissible for a longer service life of the aforesaid conventional type governor as to the connection between the arm and the plunger.

Otherwise the construction of the conventional governor in FIG. 3 is identical with that described in relation to FIG. 1 and reference is made to such description for particular details.

Further it should be noted that in FIG. 3, similar numerals with a prime refer similar parts of the conventional governor.

Now referring back to FIGS. 1 and 2, the connection between the arm 16 and the flange 30 of the plunger 15 is described in detail hereinbelow. As best shown in FIG. 2, a U-shaped connecting member 25 of resilient property is provided for such connection. One end of the member 25 is flexed generally at right angle with its extremity fitting a corresponding notch 31 in the flange 30 of the plunger 15. The other end firmly fits a small hole 32 in the arm 16 of the carriage 12. Such arrangement provides a better clamping for the member 25 to prevent thereof from falling off. Owing to the resilient property of the member 25, a contact relation is always ensured for the arm 16 and the flange 30 in operation so that the extremity of the arm 16 does not repeatedly strike the face of the flange 30 with shocks resulting from the alternated effects of gravity of the weight 13. As a result, the arm 16 and the flange are both tolerated in design or manufacturing thereof. This is a great advantage and devoid of the foregoing and related disadvantages and drawbacks inherent in the prior art arrangement described as above with reference to FIG. 3.

Figure 4:
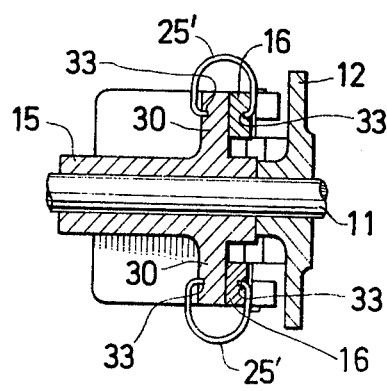
FIG. 4 is a cross sectional view similar to the view of FIG. 2 of a modification of the embodiment of FIG. 1.

In FIG. 4, there is shown another embodiment of the invention in which the connecting member 25' is formed into arcuate shape. Both the extremities of the connecting member are formed into right angle shape to fit corresponding resesses or notches 33 formed in the face of the arm 16 and the flange 30 of the plunger 15 so that the member 25' is prevented from falling off. The same desired result is obtained from this modification.

What is claimed is:

1. A vehicle speed governor including a housing; a shaft revolved by the vehicle engine; a carriage mounted on said shaft for rotation therewith; at least a pair of centrifugal weights pivoted to the carriage to swing; a plunger axially slidably movable on said shaft; an arm extending from each of the weights to move said plunger due to centrifugal movement of the weights; drive means normally spring biased toward abutment against one end of said plunger so as to resist against the centrifugal movement of the weights; electric circuit controlling means operatively connected with said drive means for controlling the vehicle travelling speed; and clasping means for releasably spring-clasping an end of each said arm and an end of said plunger.

2. A speed governor as defined in claim 1 wherein said resiliently connecting means is a U-shaped member of resilient property, said plunger being provided with a notch, and the arms being provided with a small hole, one end of the member being flexed with its extremity fitting the notch, the other end of the member fitting the small hole.

3. A speed governor as defined in claim 1 wherein said connecting means is an arcuate member of resilient property and a notch is formed in the plunger and the arms, both ends of said member being flexed to fit the corresponding notches.

4. A vehicle speed governor including a housing, a shaft which is revolved by the vehicle engine, a carriage mounted on the shaft to rotate therewith, at least a pair of centrifugal weights pivoted to the carriage to swing, an arm extending from the weights, a plunger axially slidably movable on the axis of rotation of the shaft, drive means normally springbiased toward abutment against one end of the plunger and means for abutting said plunger against the carriage, electric circuit controlling means operatively connected with said drive means for controlling the vehicle travelling speed, and resiliently connecting means to keep the extremity of the arm in resilient contact with the end of said plunger, said resiliently connecting means being a U-shaped member of resilient property, said plunger being provided with a notch, and the arms being provided with a small hole, one end of the member being flexed with its extremity fitting the notch, the other end of the member fitting the small hole.

5. A vehicle speed governor including a housing, a shaft which is revolved by the vehicle engine, a carriage mounted on the shaft to rotate therewith, at least a pair of centrifugal weights pivoted to the carriage to swing, an arm extending from the weights, a plunger axially slidably movable on the axis of rotation of the shaft, drive means normally spring-biased toward abutment against one end of the plunger and means for abutting said plunger against the carriage, electric circuit controlling means operatively connected with said drive means for controlling the vehicle travelling speed, and resiliently connecting means to keep the extremity of the arm in resilient contact with the end of said plunger, said connecting means being an arcuate member of resilient property and a notch being formed in the plunger and the arms, both ends of said member being flexed to fit the corresponding notches.

* * * * *